United States Patent [19]

Sekine et al.

[11] Patent Number: 5,761,630
[45] Date of Patent: Jun. 2, 1998

[54] VEHICLE CONTROL SYSTEM FOR MERGING VEHICLES SAFELY

[75] Inventors: Hiroshi Sekine; Nobuyoshi Asanuma, both of Saitama, Japan

[73] Assignee: Honda Giken Kogyo Kabushiki Kaisha, Tokyo, Japan

[21] Appl. No.: 620,192

[22] Filed: Mar. 22, 1996

[30] Foreign Application Priority Data

Mar. 23, 1995 [JP] Japan .................... 7-064588

[51] Int. Cl.$^6$ .................... G01C 21/00; G08G 1/09
[52] U.S. Cl. ............... 701/301; 701/36; 701/208; 340/903
[58] Field of Search ............. 364/424.045, 424.055, 364/461, 426.044, 436, 449.2; 180/167; 340/436, 902, 903

[56] References Cited

U.S. PATENT DOCUMENTS

| | | | |
|---|---|---|---|
| 5,068,654 | 11/1991 | Husher | 340/903 |
| 5,249,157 | 9/1993 | Taylor | 340/903 |
| 5,629,851 | 5/1997 | Williams et al. | 364/426.044 |
| 5,652,705 | 7/1997 | Spiess | 364/436 |

FOREIGN PATENT DOCUMENTS 5294250   11/1993   Japan .

Primary Examiner—Michael Zanelli
Attorney, Agent, or Firm—Weiner, Carrier, Burt & Esser, P.C.; Joseph P. Carrier; Irving M. Weiner

[57] ABSTRACT

When a subject vehicle is traveling on a main line which is a preferential road, the number of lanes of the main line and a lane on which the subject vehicle is traveling are detected (at steps S1 and S2). When there is a merging section with a subordinate line (at step S3), an information transmitted from another vehicle is received (at step S4). If another vehicle which will merge to the subject vehicle exists on the subordinate line (at step S5), an approach degree between the subject vehicle and the other vehicle at the merging section is determined based on the vehicle speed of the subject vehicle and the information of the other vehicle (at steps S6 and S7). If the approach degree is large, namely, there is a possibility that the subject vehicle may interfere with the other vehicle (at step S8), a vehicle traveling behind the subject vehicle is detected by a radar or the like (at step S9). If no vehicle exists behind the subject vehicle, and it is possible for the subject vehicle to change the lane (at step S10), the lane change is indicated to a driver (at step S11). If the lane change is impossible (at step S10), a warning is given to the driver (at step S12). Thus, it is possible for the subject vehicle to smoothly merge at the merging section of a road.

6 Claims, 6 Drawing Sheets

VEHICLE CONTROL SYSTEM FOR MERGING VEHICLES SAFELY

BACKGROUND OF THE INVENTION

1. Field of the Invention

The present invention relates to a vehicle control system designed to cause a vehicle to precisely merge into a group of other vehicles at a merging section on a road.

2. Description of Related Prior Art

A vehicle control system is known from Japanese Patent Application Laid-open No. 294250/93, which is designed to detect the presence or absence of a vehicle behind a subject vehicle by a radar mounted on a side mirror or the like of the subject vehicle and to give a warning to a driver when the subject vehicle attempts to change the lane having a possibility of disturbance of the traveling of the vehicle behind the subject vehicle.

In the known vehicle control system, it can be avoided that the subject vehicle interferes with the vehicle traveling behind the subject vehicle during the lane change. But it is impossible to gain an information for another vehicle traveling on another road by the radar and for this reason, it is impossible to avoid the interference of the subject vehicle with the other vehicle at the merging section of the road existing ahead.

SUMMARY OF THE INVENTION

Accordingly, it is an object of the present invention to a smooth merging of a vehicle without disturbing the traveling of another vehicle at the merging section of the road.

To achieve the above object, according to a first aspect and feature of the present invention, there is provided a vehicle control system comprising: a map information outputting means for outputting a map information including road data; a subject vehicle position detecting means for detecting a position of a subject vehicle on a map; a vehicle speed detecting means for detecting a vehicle speed of the subject vehicle; a receiver for receiving the information transmitted from a transmitter placed on another vehicle or on a road; a merging section determining means for determining whether a merging section to another road exists ahead of the subject vehicle on a road on which the subject vehicle is traveling; a merging-vehicle information determining means for discerning a merging-vehicle information for a vehicle which will merge to the subject vehicle at the merging section, based on the information received by the receiver, when the merging section exists ahead of the position of the subject vehicle; an approach-degree determining means for determining an approach degree between the subject vehicle and the merging vehicle at the merging section, based on the vehicle speed of the subject vehicle and the merging vehicle information; and a vehicle control means for controlling the subject vehicle based on the approach degree.

With the first feature of the present invention, the approach degree between the subject vehicle and the other vehicle at the merging section of the road is determined, and a vehicle control such as a warning to a driver of the vehicle, an indication of a lane change and an indication of a vehicle speed change, and an automatic vehicle speed-change control, an automatic lane-change control and the like is carried out depending upon the approach degree. Therefore, it is possible to effect a smooth merging of the subject vehicle without disturbing the other vehicle.

According to a second aspect and feature of the present invention, in addition to the first feature, the vehicle control system further includes a preferential-road determining means for discerning a preferential road from a road on which the subject vehicle is traveling and another road merging to or joining such road, wherein the vehicle control means controls the vehicle speed of the subject vehicle in accordance with the approach degree, when the other road is a preferential road.

With the second feature of the present invention, when the road on which the other vehicle is traveling is the preferential road, the vehicle speed of the subject vehicle is controlled in accordance with the approach degree. Therefore, it is possible to effect a smooth merging of the subject vehicle without disturbing the other vehicle traveling on the preferential road.

According to a third aspect and feature of the present invention, in addition to the first feature, the vehicle control system further includes a preferential-road determining means for discerning a preferential road from a road on which the subject vehicle is traveling and another road merging to or joining such road, and an other-lane determining means for determining whether another available lane exists on a road on which the subject vehicle is traveling, wherein the vehicle control means effects an indication of a lane change to a driver and/or an automatic lane-change control depending upon the approach degree when the road on which the subject vehicle is traveling is the preferential road and the another available lane exists ahead of the subject vehicle.

With the third feature of the present invention, if another available lane exists even if the road on which the subject vehicle is traveling is a preferential road, the lane change indication to the driver and/or the automatic lane-change control are carried out depending upon the approach degree. Therefore, it is possible to effect a smooth merging of the subject vehicle without disturbing the other vehicle.

According to a fourth aspect and feature of the present invention, in addition to the third feature, the vehicle control system further includes a rear-vehicle detecting means for detecting a vehicle traveling obliquely behind the subject vehicle, wherein the vehicle control means effects a lane change indication to a driver and/or an automatic lane-change control depending upon the approach degree, when no rear vehicle exists on the another available lane, or when there is a sufficient distance between the subject vehicle and the rear vehicle traveling behind the subject vehicle.

With the fourth feature of the present invention, when no rear vehicle exists on the available lane, or when there is a sufficient distance between the subject vehicle and the rear vehicle traveling behind the subject vehicle, the lane change indication and/or the automatic lane-change control is carried out. Therefore, the rear vehicle cannot be disturbed.

According to a fifth aspect and feature of the present invention, in addition to the first feature, the vehicle control system further includes a merging position determining means, wherein when there exist a plurality of vehicles merging into the subject vehicle at the merging section, the merging position determining means determines the most suitable merging position for the subject vehicle between two of the merging vehicles, based on the approach degree between the subject vehicle and each of the merging vehicles, and a merging position indicating means for indicating the merging position to the driver.

With the fifth feature of the present invention, when there are a plurality of other vehicles to be merged by the subject vehicle at the merging section, it is indicated to the driver to which of the positions among the other vehicles the subject vehicle should merge. Therefore, it is possible for the subject vehicle to easily and reliably merge to the optimal position.

According to a sixth aspect and feature of the present invention, in addition to the fifth feature, the vehicle control system further includes a front and rear vehicle information sampling means for sampling front and rear vehicle informations of vehicles ahead of and behind the merging position, based on the merging-vehicle information, wherein the vehicle control means effects a lane change indication to a driver and/or an automatic lane change control based on the vehicle speed of the subject vehicle and the front and rear vehicle informations.

With the sixth feature of the present invention, when the subject vehicle merges to the preselected merging position between the other vehicles, the lane change indication to the driver and/or the automatic lane change control are/is carried out, which enables a further easy and reliable merging of the subject vehicle.

The above and other objects, features and advantages of the invention will become apparent from the following description of preferred embodiments of the present invention.

DESCRIPTION OF THE PREFERRED EMBODIMENTS

The present invention will now be described by way of preferred embodiments with reference to the accompanying drawings.

Figure 1:
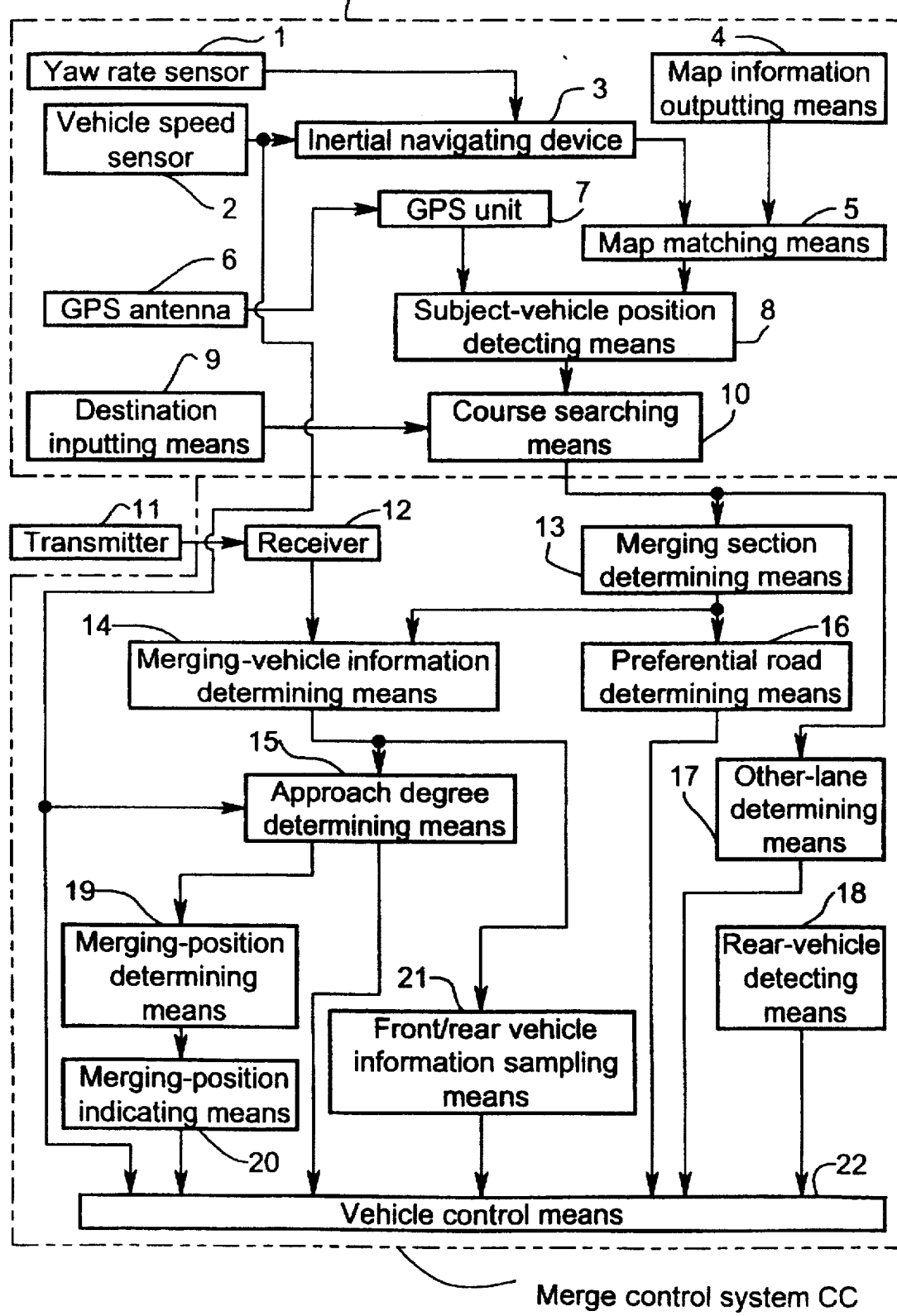
FIG. 1 is a block diagram of the entire arrangement of a vehicle control system according to a first embodiment of the present invention.

FIG. 1 shows a navigation system NV for a vehicle and a merge control system CC, in which a vehicle control system according to a first embodiment is incorporated. The navigation system NV includes an inertial navigating device 3 to which signals from a yaw rate sensor 1 and a vehicle speed sensor 2 are inputted, a map information outputting means 4 using an IC card or a CD-ROM, and a map matching means 5 for superposing a vehicle travel locus outputted by the inertial navigating device 3 and a map information outputted by the map information outputting means 4 on each other. The navigation system NV further includes a GPS unit to which a signal from a GBPS antenna 6 is inputted, a subject-vehicle position detecting means 8 for detecting the position of a subject vehicle based on position coordinates outputted by the map matching means 5 and position coordinates outputted by the GPS unit, and a course searching means 10 for searching a course to a destination based on a destination coordinate signal from a destination input means 9 and subject-vehicle position coordinates from the subject-vehicle position detecting means 8.

The merge control system CC includes: a receiver 12 for receiving a signal from a transmitter 11 provided in the vehicle for transmitting the position and speed of the vehicle; a merging section determining means 13 for determining a merging section existing on a course searched by the course searching means 10; a merging vehicle information discerning means 14 for discerning, from other-vehicle's informations received by the receiver 12, information of other vehicle which is approaching the merging section; an approach degree determining means 15 for determining the approach degree between the subject vehicle and the other vehicle in the merging section; and a vehicle control means 22 for controlling the subject vehicle based on the approach degree.

The vehicle control means 22 includes: a means for informing the driver by a chime, a buzzer, a voice, a lamp, CTR or the like; a means for adjusting the throttle opening degree to automatically control the vehicle speed; and a means for adjusting the steering reaction force to assist the changing of the traffic lane.

The merge control system CC includes a preferential road determining means 16 for determining which of merging roads is a preferential road (e.g., a main line in an express highway), and which of the merging roads is a non-preferential road (e.g., a ramp road in an express highway), an other-lane determining means 17 for determining whether or not there exists another available traffic lane in a road on which a subject vehicle is traveling, and a rear-vehicle detecting means 18 such as a radar sensor or the like mounted on the vehicle for detecting a vehicle traveling on an adjacent lane behind the subject vehicle.

Further, the merge control system CC includes a merging-position determining means 19 for determining when a plurality of other vehicles are traveling on another road which will merge to or joins a road on which the subject vehicle is traveling and the other vehicles are approaching a merging point of the two road, the merging-position determining means 19 determines which position between two of the plurality of the other vehicles the subject vehicle should merge or intrude into.

The merge control system CC further includes: a merging-position indicating means 20 for indicating the determined merging position to the driver by voice or the like; and a front/rear vehicle information sampling means 21 for detecting positions and vehicle speeds of front and rear vehicles traveling ahead of and behind the merging position.

Figure 2:
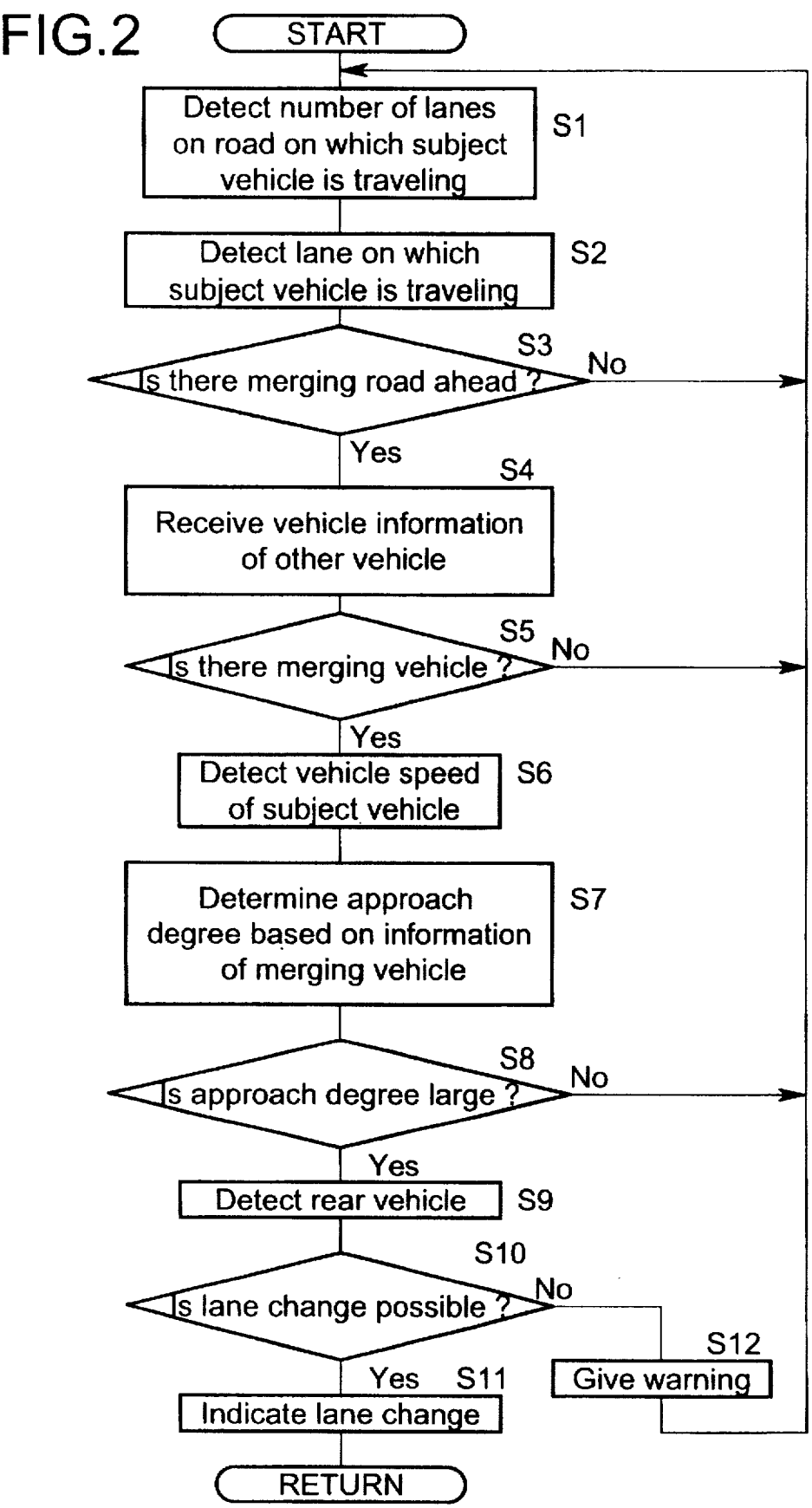
FIG. 2 is a flowchart carried out during traveling of a subject vehicle on a main line.

The operation carried out when the subject vehicle is traveling on a main line of an express highway will be described below with reference to the flowchart in FIG. 2.

First, at steps S1 and S2, the number of lanes of a road on which the subject vehicle is traveling and a lane on which the subject vehicle is traveling are detected based on the map information. If a subordinate line such as ramp way exists ahead of the subject vehicle at step S3, information of another vehicle (i.e., the position and vehicle speed of another vehicle) transmitted from a transmitter 11 mounted on the another vehicle is received by a receiver 12 mounted on the subject vehicle at step S4.

Then, if another vehicle exists on the subordinate line which merges to or joins a main line at step S5, a vehicle speed of the subject vehicle is detected by the vehicle speed sensor 2 at step S6. Then, at step S7, a time taken for the subject vehicle to reach a merging point between the main and subordinate lines is calculated based on the position and vehicle speed of the subject vehicle, and a time taken for the another vehicle to reach a merging point between the main and subordinate lines is calculated based on the position and vehicle speed of the another vehicle. And an approach degree of the subject vehicle to the other vehicle at the merging point is determined based on such time difference. Thus, if the time difference is smaller, it is determined that the approach degree is larger.

If the approach degree is larger than a predetermined threshold value at step S8, the position and vehicle speed of a vehicle traveling behind the subject vehicle are detected by the rear-vehicle detecting means 18 at step S9. If the subject vehicle can change the lane without obstructing the traveling of the rear vehicle at step S10, the lane change is indicated to the driver by voice or the like at step S11. On the other hand, if the lane change is impossible at step S10, a warning is given to the driver at step S12. This warning may be not only a mere informing to the driver, but also may be an indication of increasing or decreasing of speed.

When the lane change is indicated to the driver at step S11, if an actuator of a power steering device may be operated to change a steering assist characteristic in one direction, it is possible to more easily and reliably carry out the lane change.

If the merging road exists ahead at step S3, the warning "existing of merging road ahead" may be given by voice or the like. If a merging vehicle exists at step S5, the warning "existing of merging vehicle" may be given by voice or the like. If the approach degree is high at step S8, the warning "caution to merging vehicle" may be given by voice or the like.

When another vehicle merges or intrudes into the main line on which the subject vehicle is traveling, from the subordinate line which merges to the main line, as described above, the other vehicle can be permitted to smoothly merge into the main line by giving the warning or the indication of the lane change to the driver.

Figure 3:
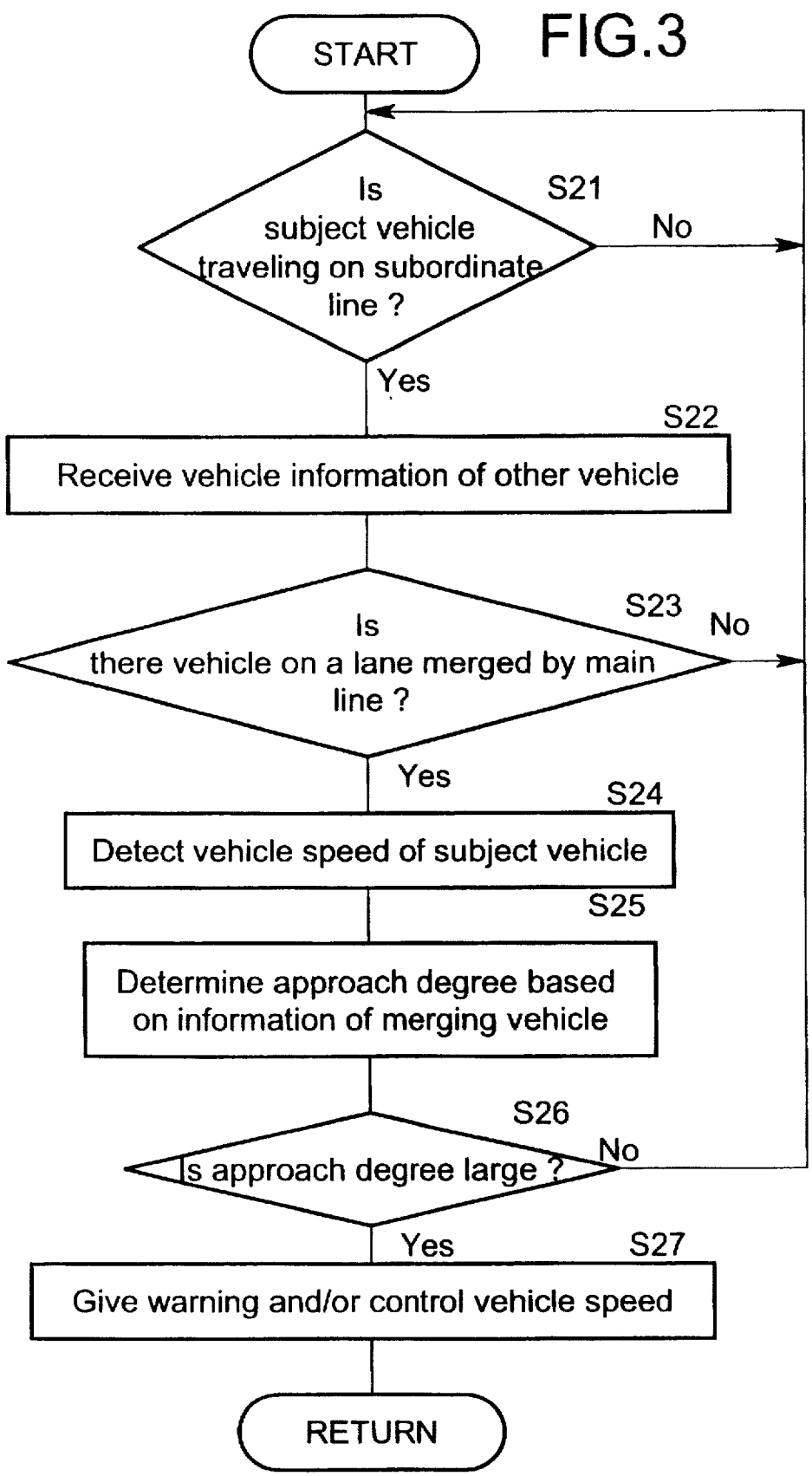
FIG. 3 is a flowchart carried out during traveling of the subject vehicle on a subordinate line.

The operation carried out during traveling of the subject vehicle on the subordinate line in an express highway will be described below with reference the flowchart in FIG. 3.

First, if a road on which the subject vehicle is traveling is a subordinate line at step S21, an other-vehicle information from the transmitter 11 mounted on another vehicle is received by the receiver 12 mounted on the subject vehicle at step S22.

Then, if there is another vehicle on a lane merged or joined by the main line at step S23, a vehicle speed of the subject vehicle is detected by the vehicle speed sensor 2 at step S24, and an approach degree of the subject vehicle to the other vehicle at the merging point is determined at step S25 based on the time taken for the subject vehicle to reach the merging point and the time taken for the other vehicle to reach the merging point. If the approach degree is larger than the predetermined threshold value at step S26, a warning is provided to the driver at step S27. At this time, in addition to the warning to the driver, an indication for increasing or reducing the vehicle speed can be provided to the driver, or an automatic vehicle speed control can be conducted.

In addition, if the merging road exists ahead at step S21, a warning "existing of merging road ahead" may be given by voice or the like. If the merging vehicle exists at step S23, a warning "existing of merging vehicle" may be given by voice or the like. If the approach degree is higher at step S26, a warning "caution to merging vehicle" may be given by voice.

As described above, if the other vehicle exists on the main line when the subject vehicle merges or intrudes into the main line from the subordinate line, the subject vehicle can merges smoothly into the main line without disturbing the other vehicle by giving the warning to the driver or conducting the automatic vehicle speed control.

Figure 4:
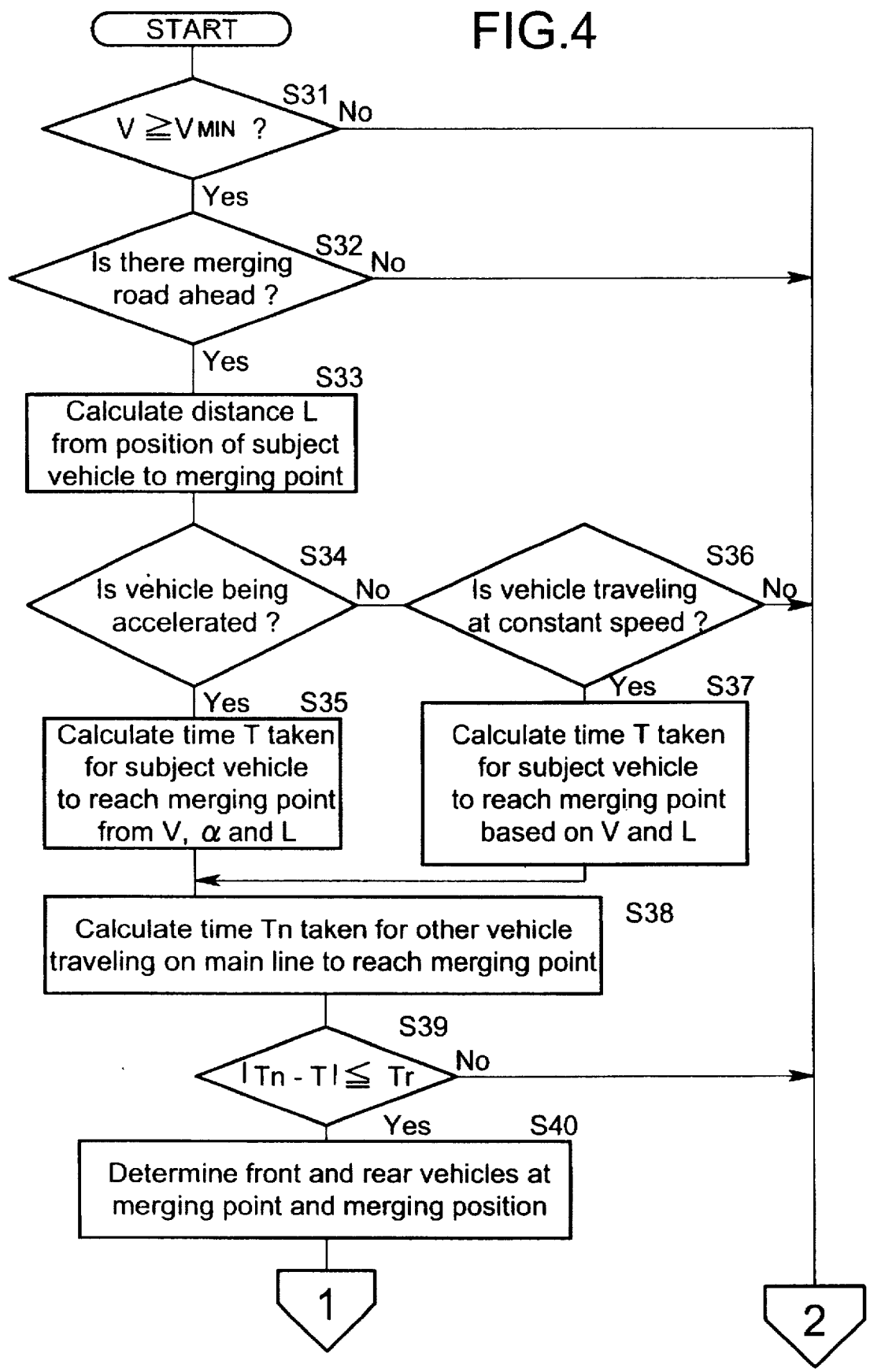
FIG. 4 is a first portion of a flowchart carried out during traveling of the subject vehicle on a subordinate line in a vehicle control system according to a second embodiment.
Figure 5:
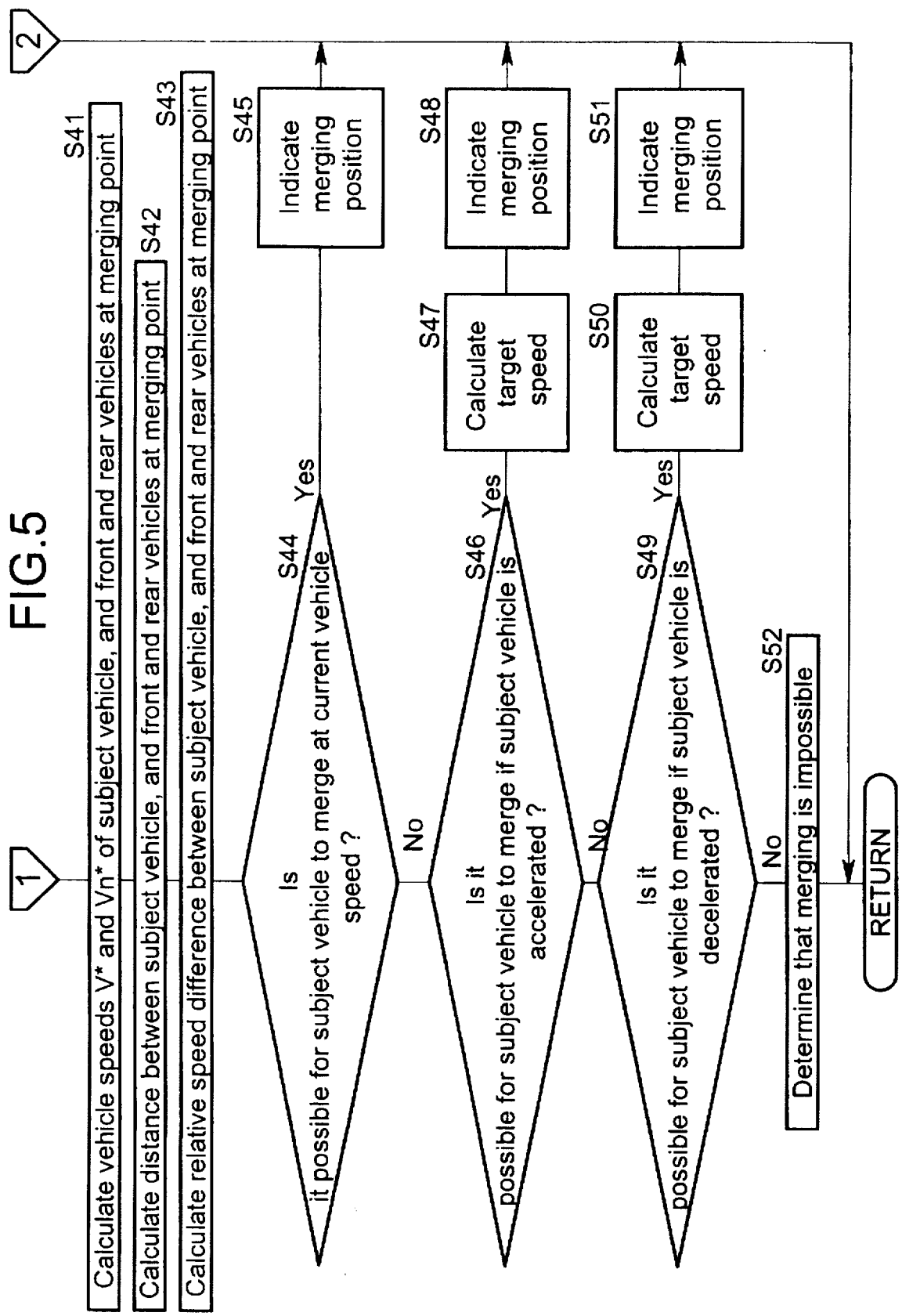
FIG. 5 is a second portion of the flowchart.
Figure 6:
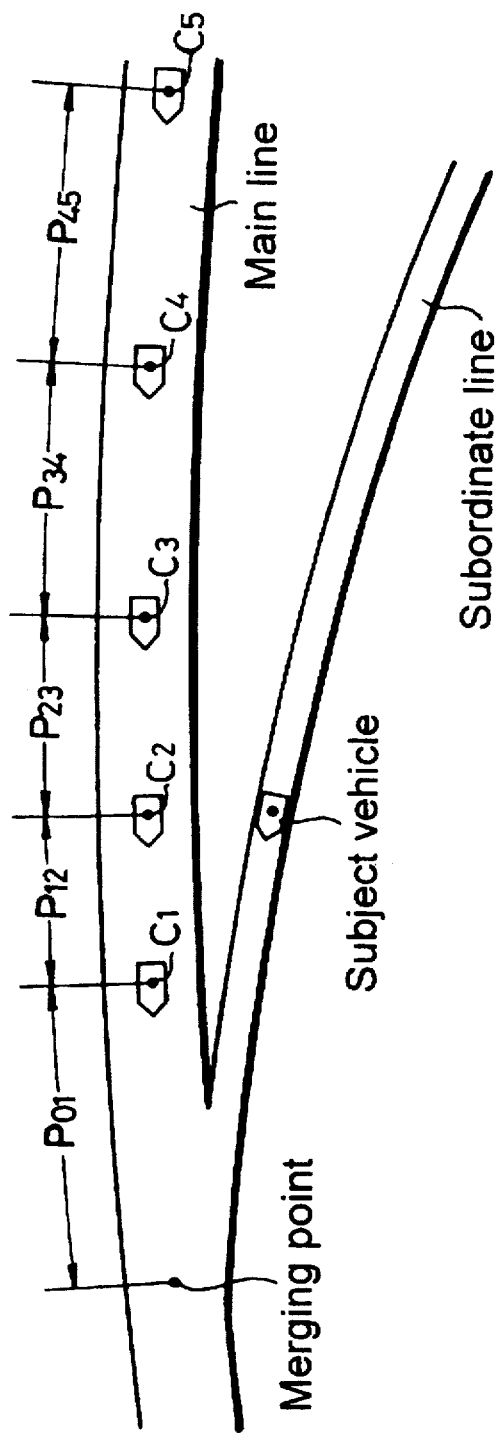
FIG. 6 is a diagrammatic illustration for explaining the operation.

The operation of a second embodiment in which the subject vehicle is traveling on the subordinate line will be described below with reference to the flowcharts FIGS. 4 and 5 and the illustration in FIG. 6.

First, if the vehicle speed V of the subject vehicle traveling on a subordinate line is lower than a minimum vehicle speed $V_{MIN}$ at step S31, a merge control is not carried out based on the determination of the fact that the of the subject vehicle is impossible. If the vehicle speed V of the subject vehicle is equal to or higher than the minimum vehicle speed $V_{MIN}$ and if a merging point to the main line exists ahead at step S32, a distance L from the position of the subject vehicle to the merging point is calculated at step S33.

If the subject vehicle is currently accelerated at step S34, a time T taken for the subject vehicle to reach the merging point is calculated at step S35 according to the following equation (1) which is a relation among the vehicle speed V of the subject vehicle, the acceleration α of the subject vehicle and the distance L from the position of the subject vehicle to the merging point:

$$L=VT+\alpha T^2/2 \tag{1}$$

On the other hand, if the subject vehicle is currently traveling at a constant speed at step S36, the time T taken for the subject vehicle to reach the merging point is calculated according to the following equation (2) which is a relation between the vehicle speed V of the subject vehicle and the distance L from the position of the subject vehicle to the merging point:

$$L=VT \tag{2}$$

Then, a distance Ln to the merging point from a plurality of other vehicles traveling on the main line toward the merging point, a vehicle speed Vn and an acceleration αn of such other vehicles are determined, and a time Tn for the other vehicles to reach the merging point are calculated according to the following equation (3) which is a relation among the distance Ln, the vehicle speed Vn and the acceleration αn:

$$Ln=VnTn+\alpha n Tn^2/2 \tag{3}$$

Here, n is a number assigned to each of the plurality of vehicles traveling on the main line sequentially from the vehicle nearest the merging point. The rearmost other-vehicle (the maximum value of n) which is the subject of the merge control is selected as a rearmost other-vehicle which has a possibility that it reaches the merging point within a time taken for the subject vehicle to reach the merging point at the minimum vehicle speed $V_{MIN}$. Thus, the numbers 1, 2, 3, - - - are affixed to all the other vehicles which may approach the subject vehicle at the merging point.

Then, the absolute value |Tn−T| of a difference between the time Tn taken for the respective other vehicles to reach the merging point and the time T taken for the subject vehicle to reach the merging point is compared with a threshold value Tr at step S39. If the absolute value |Tn−T| of the difference is equal to or smaller than the threshold value Tr, it is determined that there is a possibility that the subject vehicle and any other vehicle may approach each other at the merging point, and appropriate front and rear vehicles are determined from the vehicles $C_1$, $C_2$, - - - , which will come ahead of and behind the subject vehicle when the subject vehicle has reached the merging point, and at the same time, an appropriate merging position is determined from the merging positions $P_{01}$, $P_{12}$, $P_{23}$, $P_{34}$, $P_{45}$, --- at which the subject vehicle can intrude into the other-vehicle group, at step S40 (see FIG. 6). For example, when the second and third other vehicles $C_2$ and $C_3$ are determined as front and rear vehicles, the subject vehicle will merge to the merging position $P_{23}$ between the front and rear vehicles $C_2$ and $C_3$ at the merging point.

Subsequently, at step S41, a vehicle speed V when the subject vehicle has reached the merging point is calculated using the vehicle speed V and the acceleration $\alpha$ of the subject vehicle and the time T taken for the subject vehicle to reach the merging point according to the following equation (4):

$$V^* = V \qquad (4)$$

if the subject vehicle is currently traveling at a constant speed, or according to the following equation (5):

$$V^* = V + \alpha T \qquad (5)$$

if the vehicle is currently accelerated. And a vehicle speed $Vn^*$ at the time when each of the front and rear vehicles has reached the merging point is calculated using the time Tn for the front and rear vehicles to reach the merging point, according to the following equation (6):

$$Vn^* = Vn + \alpha n Tn \qquad (6)$$

Then, at step S42, a distance between the subject vehicle and each of the front and rear vehicles (e.g., another vehicles $C_2$ and $C_3$) at the merging point is calculated based on the position of the front and rear vehicles at the time when the subject vehicle has reached the merging point, and at step S43, a relative speed difference $|Vn^*-V^*|$ between the vehicle speed $V^*$ of the subject vehicle and the vehicle speed $Vn^*$ of each of the front and rear vehicles at the merging point is calculated.

At step S44, if the distances between the subject vehicle and the front and rear vehicle calculated at step S42 are sufficiently large and the relative speed difference between the vehicle speed $V^*$ of the subject vehicle and the vehicle speeds $Vn^*$ of the front and rear vehicles calculated at step S43 is sufficiently small, so that it is possible for the subject vehicle to merge if it travels at the current vehicle speed, the merging position (e.g., the merging position $P_{23}$) is indicated to the driver by voice or pictorial image. On the other hand, if it is impossible for the subject vehicle to merge at the current vehicle speed at step S44 but if the merging of the subject vehicle will be possible by accelerating the subject vehicle at step S46, a target speed enabling the merging of the subject vehicle is calculated and indicated to the driver at step S47, and a merging position is indicated to the driver at step S48. If the merging of the subject vehicle will be possible by decelerating the subject vehicle at step S49, a target speed enabling the merging of the subject vehicle is calculated and indicated to the driver at step S50, and a merging position is indicated to the driver at step S51. Further, if it is impossible for the subject vehicle to merge even if the current speed of the subject vehicle is maintained, or even if the subject vehicle is accelerated or decelerated, it is determined that the merging of the subject vehicle is impossible, and a warning is given to the driver.

In place of indicating the target vehicle speed to the driver at steps S47 and S50, an automatic vehicle speed control may be carried out to provide a target vehicle speed.

As described above, even if a plurality of other vehicles on the main line when the subject vehicle merges into the main line from the subordinate line, it is possible for the subject vehicle to smoothly merge or intrude into the main line without disturbing the other vehicles by indicating the merging position and the merging speed to the driver.

Although the embodiments of the present invention have been described in detail, it will be understood that the present invention is not limited to the above-described embodiments, and various modifications may be made without departing from the spirit and scope of the invention defined in claims.

For example, in place of mounting of the transmitter 11 on the other vehicle, a transmitter 11 for detecting and transmitting the position and speed of a vehicle passing through a merging point between roads may be placed in the vicinity of the merging point.

What is claimed is:

1. A vehicle control system comprising:

a map information outputting means for outputting a map information including road data;

a subject vehicle position detecting means for detecting a position of a subject vehicle on a map;

a vehicle speed detecting means for detecting a vehicle speed of the subject vehicle;

a receiver for receiving the information transmitted from a transmitter placed on another vehicle or on a road;

a merging section determining means for determining whether a merging section to another road exists ahead of the subject vehicle on a road on which the subject vehicle is traveling;

a merging-vehicle information determining means for discerning a merging-vehicle information for a vehicle which will merge to the subject vehicle at the merging section, based on the information received by the receiver, when the merging section exists ahead of the position of the subject vehicle;

an approach-degree determining means for determining an approach degree between the subject vehicle and the merging vehicle at the merging section, based on the vehicle speed of the subject vehicle and the merging vehicle information; and a vehicle control means for controlling the subject vehicle based on the approach degree.

2. A vehicle control system according to claim 1, further including a preferential-road determining means for discerning a preferential road from a road on which the subject vehicle is traveling and another road merging to or joining such road, wherein the vehicle control means controls the vehicle speed of the subject vehicle in accordance with the approach degree, when said other road is a preferential road.

3. A vehicle control system according to claim 1, further including a preferential-road determining means for discerning a preferential road from a road on which the subject vehicle is traveling and another road merging to or joining such road, and an other-lane determining means for determining whether another available lane exists on a road on which the subject vehicle is traveling, wherein said vehicle control means effects an indication of a lane change to a driver and/or an automatic lane-change control depending upon said approach degree when the road on which the subject vehicle is traveling is the preferential road and the another available lane exists ahead of the subject vehicle.

4. A vehicle control system according to claim 3, further including a rear-vehicle detecting means for detecting a vehicle traveling obliquely behind the subject vehicle, wherein said vehicle control means effects a lane change indication to a driver and/or an automatic lane-change control depending upon the approach degree, when no rear vehicle exists on the another available lane, or when there is a sufficient distance between the subject vehicle and the rear vehicle traveling behind the subject vehicle.

5. A vehicle control system according to claim 1, further including a merging position determining means, wherein when there exist a plurality of vehicles merging into the subject vehicle at the merging section, said merging position determining means determines the most suitable merging position for the subject vehicle between two of the merging vehicles, based on the approach degree between the subject vehicle and each of the merging vehicles, and a merging position indicating means for indicating the merging position to the driver.

6. A vehicle control system according to claim 5, further including a front and rear vehicle information sampling means for sampling front and rear vehicle informations of vehicles ahead of and behind the merging position, based on said merging-vehicle information, wherein said vehicle control means effects a lane change indication to a driver and/or an automatic lane change control based on the vehicle speed of the subject vehicle and said front and rear vehicle informations.

* * * * *

UNITED STATES PATENT AND TRADEMARK OFFICE
CERTIFICATE OF CORRECTION

PATENT NO.   :   5,761,630
DATED        :   June 2, 1998
INVENTOR(S)  :   Hiroshi Sekine, Nobuyoshi Asanuma It is certified that error appears in the above-identified patent and that said Letters Patent is hereby corrected as shown below:

Column 3, line 57, change "GBPS" to --GPS--.

Signed and Sealed this

Third Day of November, 1998

Attest:

BRUCE LEHMAN

*Attesting Officer*          *Commissioner of Patents and Trademarks*